Aug. 16, 1927.
V. H. TODD
1,638,894
THERMOAMMETER
Filed Feb. 18, 1924
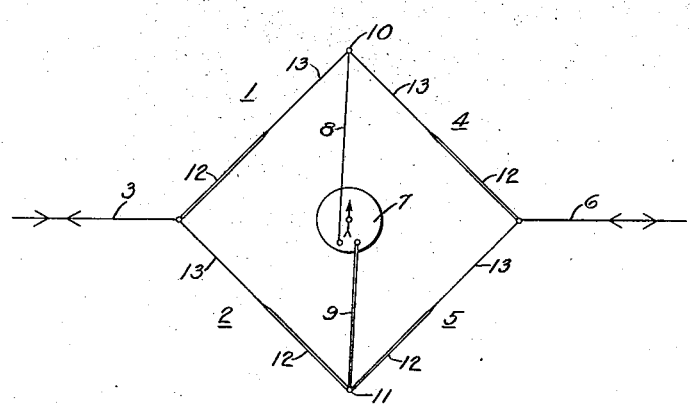
WITNESSES:
INVENTOR
Victor H. Todd.
BY
Wesley G. Carr
ATTORNEY Patented Aug. 16, 1927.

1,638,894

UNITED STATES PATENT OFFICE.

VICTOR H. TODD, OF SUMMIT, NEW JERSEY, ASSIGNOR TO WESTINGHOUSE ELECTRIC & MANUFACTURING COMPANY, A CORPORATION OF PENNSYLVANIA.

THERMOAMMETER.

Application filed February 18, 1924. Serial No. 693,577.

My invention relates to thermo meters and particularly to thermo ammeters for use in radio or other high-frequency circuits.

One object of my invention is to provide a meter, of the above indicated character, that shall operate independently of the ordinary resistor heating means usually employed in thermo meters.

Another object of my invention is to provide a thermo meter that shall embody thermo couples, to be traversed by alternating current, and direct-current responsive means, connected to the alternating-current circuit, to be energized by the thermally-generated current of the couples independently of the alternating current.

A further object of my invention is to provide a thermo meter that shall be simple and durable in construction, economical to manufacture and effective in its operation.

Heretofore, in thermo meters for measuring alternating currents, it has been usual to employ a heater in the alternating-current circuit to be measured and a thermo-couple to be heated by the heater for actuating a direct-current instrument by the thermally-generated current of the couple.

In practicing my invention, I so connect a plurality of thermo couples to be traversed by the current of an alternating-current circuit as to permit a direct-current instrument connected to the couples, to be energized by the current generated in the couples, independently of the alternating current therein, thus eliminating the heater usually employed to heat the couples and providing a simple and effective meter.

The single figure of the accompanying drawings is a diagrammatic view of a thermo meter embodying my invention.

A static network constructed in the form of a Wheatstone bridge comprises legs 1 and 2. A conductor 3 traversed by alternating current connected therebetween, legs 4 and 5, between which a conductor 6 traversed by alternating-current is connected, and a direct-current responsive instrument or means 7, connected, by conductors 8 and 9, between equi-potential points 10 and 11 on the bridge. There are, thus, two parallel paths, between the conductors 3 and 6; the one path comprising the legs 1 and 4 in series with each other and the other path comprising the legs 2 and 5 in series with each other.

Each of the legs 1, 2, 4, and 5 constitute a thermo couple comprising metal elements 12 and 13 of different characteristics, such as manganin and advance. The elements 12 and 13 are preferably tapered, or otherwise formed, to reduce the cross-sectional areas thereof adjacent to the junction of the different metals. This construction serves to concentrate the heat of the couple at its most effective position.

The elements 12 and 13 are so connected that there is a thermo couple formed at the middle of each leg of the bridge and at the points of connection of the bridge to the conductors 3 and 6. However, the connection is such that no thermo couple is formed at either of the points 10 and 11. The conductor 8 is preferably of metal, similar to the metal of the elements 13, between two of which it is connected, and the conductor 9 is of metal similar to the metal of elements 12, between two of which it is connected.

The above construction and relation of elements operates, when alternating current traverses the conductors 3 and 6, to cause a direct current to flow in the bridge, proportional to the root-mean-square value of the alternating current. This direct-current is in such direction that, since the conductors 8 and 9 are connected to the equi-potential points 10 and 11 in the alternating-current circuit, the instrument 7 is energized only by the direct current, independently of the alternating current. Thus, the usual or added heating resistor is eliminated and a simple effective thermo meter is provided.

While I have shown and described a particular form of my invention, changes may be effected therein without departing from the spirit and scope thereof, as set forth in the appended claims.

I claim as my invention:

1. In combination, a Wheatstone bridge including two parallel alternating-current branches each embodying two series-related arms of the bridge and each arm comprising a thermo couple, said branches being connected at the ends thereof by elements of opposite material of the adjacent couples and the mid point of each branch constituting a position of joinder between elements of similar material of couples on opposite sides thereof but of material opposite to that on opposite sides of the mid point of the other branch, a direct-current responsive device, and a pair of conductors of different material each corresponding to the material adjacent to one of said mid points and each connected between the point of corresponding material and said device.

2. In combination, a Wheatstone bridge including two parallel alternating-current branches each embodying two series-related arms of the bridge and each arm comprising a thermo couple, said branches being connected at the ends thereof by elements of opposite material of the adjacent couples and the mid point of each branch constituting a position of joinder between elements of similar material of couples on opposite sides thereof but of material opposite to that on opposite sides of the mid point of the other branch, a direct-current responsive device, and a pair of conductors of different material each corresponding to the material adjacent to one of said mid points and each connected between the point of corresponding material and said device, the elements of said couples being convergingly tapered toward the junction thereof.

In testimony whereof, I have hereunto subscribed my name this eleventh day of February, 1924.

VICTOR H. TODD.